(12) United States Patent
Gulam et al.

(10) Patent No.: US 10,417,096 B2
(45) Date of Patent: Sep. 17, 2019

(54) MULTI-VIRTUAL MACHINE TIME CONSISTENT SNAPSHOTS

(71) Applicant: VMware, Inc., Palo Alto, CA (US)

(72) Inventors: Nagib Gulam, Austin, TX (US); Dirk Karjack, Capitola, CA (US); Matthew Thurmaier, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 67 days.

(21) Appl. No.: 15/655,174

(22) Filed: Jul. 20, 2017

(65) Prior Publication Data

US 2019/0026187 A1 Jan. 24, 2019

(51) Int. Cl.
*G06F 11/14* (2006.01)
*G06F 9/455* (2018.01)
*G06F 16/11* (2019.01)

(52) U.S. Cl.
CPC ...... *G06F 11/1446* (2013.01); *G06F 9/45533* (2013.01); *G06F 9/45558* (2013.01); *G06F 16/128* (2019.01); *G06F 11/1484* (2013.01)

(58) Field of Classification Search
CPC ............ G06F 11/1446; G06F 9/45558; G06F 17/30088; G06F 11/1484
See application file for complete search history.

(56) References Cited

U.S. PATENT DOCUMENTS

| | | | | |
|---|---|---|---|---|
| 8,321,377 | B2* | 11/2012 | Michael | G06F 11/1458 707/639 |
| 9,823,973 | B1* | 11/2017 | Natanzon | G06F 11/1446 |
| 2006/0123210 | A1* | 6/2006 | Pritchett | G06F 11/1466 711/162 |
| 2011/0078115 | A1* | 3/2011 | Elrom | G06F 17/30578 707/639 |
| 2012/0023068 | A1* | 1/2012 | Elrom | G06F 11/1461 707/639 |
| 2012/0066435 | A1* | 3/2012 | Colgrove | G06F 3/061 711/103 |
| 2014/0365740 | A1* | 12/2014 | Vasilyev | G06F 11/1451 711/162 |
| 2015/0193454 | A1* | 7/2015 | Peretz | G06F 17/30088 707/639 |
| 2016/0103738 | A1* | 4/2016 | Forgette | G06F 11/1438 707/639 |
| 2017/0329539 | A1* | 11/2017 | Ko | G06F 3/0619 |

* cited by examiner

*Primary Examiner* — Ryan Bertram
(74) *Attorney, Agent, or Firm* — Thomas | Horstemeyer, LLP

(57) ABSTRACT

A method of generating time-coordinated snapshots across virtual machines (VMs) managed by at least one hypervisor executing in at least one host computer is described. The method includes: controlling at least one hypervisor to activate write caches for caching write traffic, generated by the VMs, targeting virtual disks; receiving, from the at least one hypervisor, messages that indicate idle periods in the write traffic; determining a quiescent window in the write traffic across the VMs from the idle periods; controlling the at least one hypervisor to flush the write caches up to a start time of the quiescent window; and controlling the at least one hypervisor to generate snapshots of the VMs.

20 Claims, 7 Drawing Sheets

MULTI-VIRTUAL MACHINE TIME CONSISTENT SNAPSHOTS

BACKGROUND

Most commercial hypervisors have a feature that, when invoked, preserves the current state of a virtual machine (VM) in file(s) on persistent storage. Each instance of preserved VM state is referred to as a "snapshot." The preserved state can include central processing unit (CPU) register state, random access memory (RAM) state, and virtual disk state. These same hypervisors also have a feature that, when invoked, restores the state of a VM from a snapshot.

Some virtualized computing systems include applications executing in multiple VMs that cooperate to process transactions. The transactions flow from application to application and are tracked on virtual disks attached to the VMs. An administrator can generate snapshots of these VMs for the purpose of backup, cloning, development and testing, and the like. The hypervisors do not provide a method of snapshotting multiple VMs at the same time, nor can they due to limits of multi-tasking and non-deterministic schedulers. However, since the applications are connected and cooperatively process transactions, the resulting snapshots can create an inconsistent state among the applications. The challenge is that the snapshots are generated seconds or minutes apart, which can result in duplicate or missing transactions if the VMs revert to the individual snapshots. This requires the administrator to manually reconcile duplicate and/or missing transactions in the event of reversion to the snapshots, which is expensive and error prone. Alternatively, the administrator can shut down the VMs while generating the snapshots. However, shutting down VMs is not feasible or desirable in many production environments and can impact revenue generation.

SUMMARY

Techniques for multi-virtual machine time consistent snapshots are described. In an embodiment, a method of generating time-coordinated snapshots across virtual machines (VMs) managed by at least one hypervisor executing in at least one host computer is described. The method includes: controlling at least one hypervisor to activate write caches for caching write traffic, generated by the VMs, targeting virtual disks; receiving, from the at least one hypervisor, messages that indicate idle periods in the write traffic; determining a quiescent window in the write traffic across the VMs from the idle periods; controlling the at least one hypervisor to flush the write caches up to a start time of the quiescent window; and controlling the at least one hypervisor to generate snapshots of the VMs.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
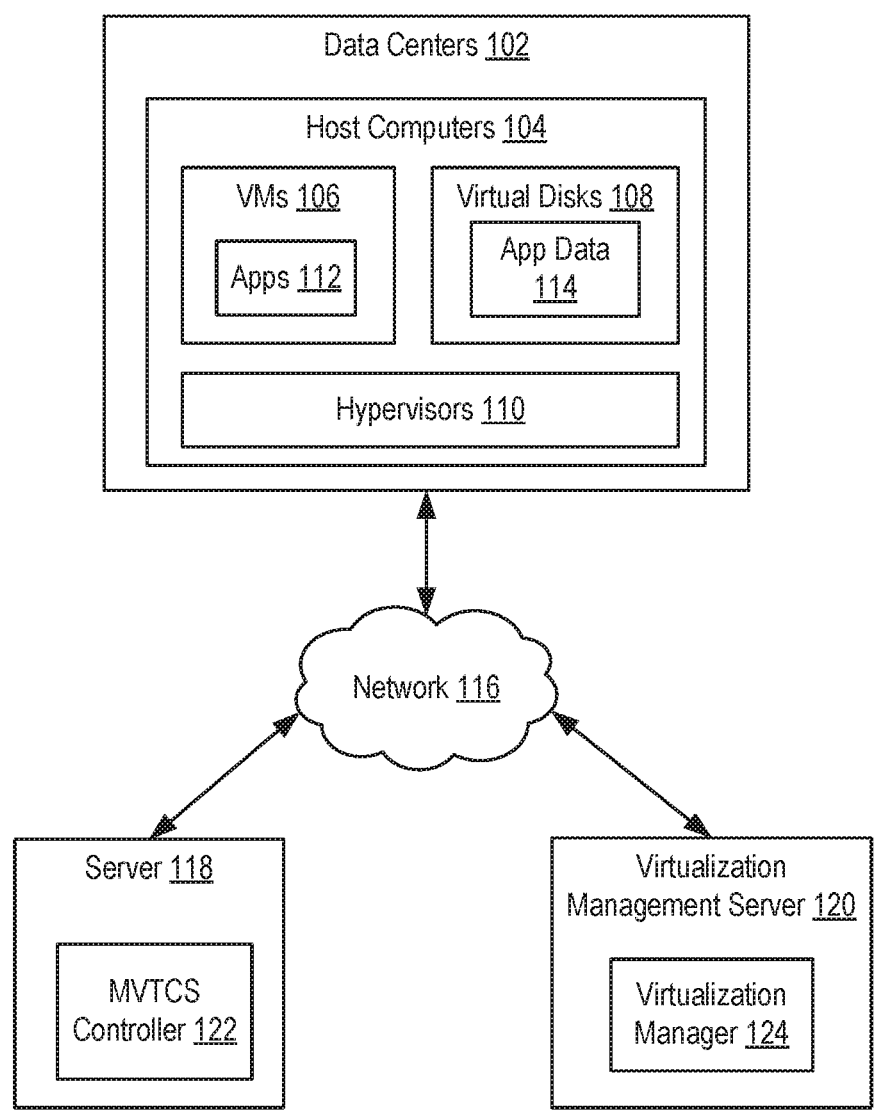
FIG. 1 is a block diagram depicting a networked computer system according to an embodiment.

FIG. 1 is a block diagram depicting a networked computer system 100 according to an embodiment. Networked computer system 100 includes one or more data centers ("data centers 102"), a server 118, and a virtualization management server 120, each coupled to a network 116. Each of data centers 102 includes a plurality of host computers 104. Host computers 104 include virtual machines (VMs) 106 managed by hypervisors 110. VMs 106 execute applications ("apps 112"). Hypervisors 110 allocate virtual disks 108 for use by VMs 106. Applications 112 store data ("app data 114") in virtual disks 108. In an embodiment, applications 112 are connected and cooperatively process transactions.

Controller server 118 includes a multi-VM time consistent snapshot (MVTCS) controller 122. MVTCS controller 122 is software executed by server 118 to coordinate time-synchronized snapshots across VMs 106. A collection of time-synchronized snapshots is referred to herein as a "super snapshot." MVTCS controller 122 cooperates with components of hypervisors 110 to generate super snapshots, as described further below. Each super snapshot preserves a consistent state across applications 112. Moreover, MVTCS controller 122 can generate a super snapshot without shutting down VMs 106. Server 118 can be implemented by a physical computer or in a VM executing on a host computer. In an embodiment, MVTCS controller 122 can include an interface that provides direct access to MVTCS controller 122 (e.g., a command line interface (CLI), graphical user interface (GUI), or the like). An administrator can interact with MVTCS controller 122 directly through such interface.

Virtualization management server 120 includes virtualization manager 124. Virtualization manager 124 is software executed by the virtualization management server 120 to manage hypervisors 110 in host computers 104. In an embodiment, MVTCS controller 122 includes an application programming interface (API) that includes functions for generating super snapshots, managing super snapshots, and reverting to super snapshots. Virtualization manager 124 can include a component or components that interact with MVTCS controller 122 through its API. An administrator can interact with MVTCS controller 122 through virtualization manager 124.

Figure 2:
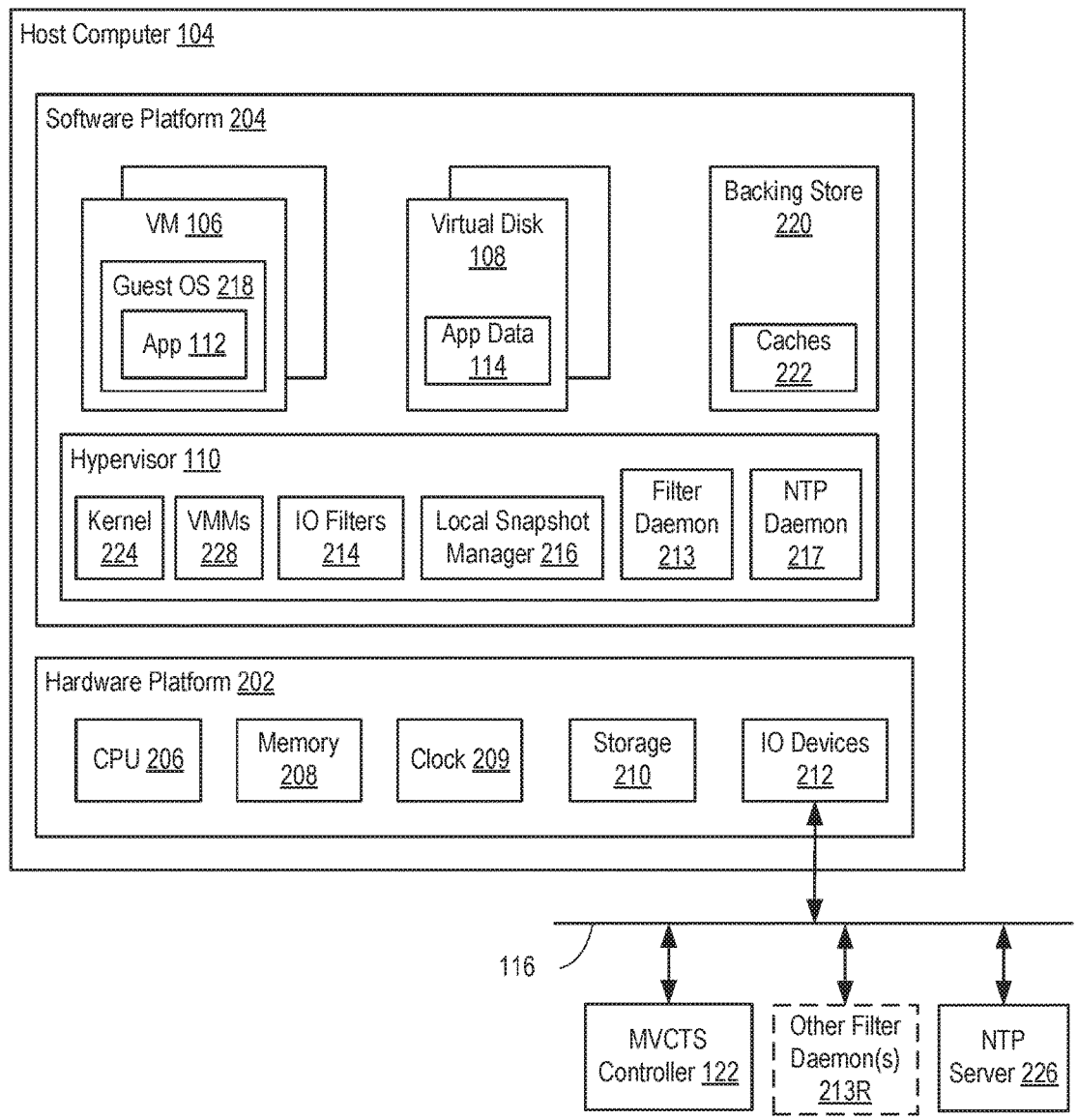
FIG. 2 is a block diagram depicting a host computer according to an embodiment.

FIG. 2 is a block diagram depicting a host computer 104 according to an embodiment. Host computer 104 includes a software platform 204 executing on a hardware platform 202. Hardware platform 202 may include conventional components of a computing device, such as a central processing unit (CPU) 206 and system memory ("memory 208"), as well as a storage system ("storage 210"), input/output (10) devices 212, clock 209, and the like. CPU 206 is configured to execute instructions, for example, executable instructions that perform one or more operations described herein and may be stored in memory 208 and storage 210. Memory 208 is a device allowing information, such as executable instructions, virtual disks, configurations, and other data, to be stored and retrieved. Memory 208 may include, for example, one or more random access memory (RAM) modules. Storage 210 includes local storage devices (e.g., one or more hard disks, flash memory modules, solid state disks, and optical disks) and/or a storage interface that enables host computer 104 to communicate with one or more network data storage systems. Examples of a storage interface are a host bus adapter (HBA) that couples host computer 104 to one or more storage arrays, such as a storage area network (SAN) or a network-attached storage (NAS), as well as other network data storage systems. IO devices 212 include conventional interfaces known in the art, such as one or more network interfaces. IO devices 212 can be coupled to a network 116 for communication with remote systems, including MVCTS controller 122, network time protocol (NTP) server 226, and optionally one or more other filter daemons 213R. Clock 209 maintains time for host computer 104.

In an embodiment, software platform 204 includes a hypervisor 110 that executes directly on hardware platform 202 (e.g., a "bare-metal" hypervisor). Hypervisor 110 is a virtualization layer that abstracts processor, memory, storage, and networking resources of hardware platform 202 into one or more VMs 106 that run concurrently on host computer 104. VMs 106 run on top of hypervisor 110, which enables sharing of the hardware resources. One example of a hypervisor that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Each VM 106 includes a guest operating system (OS) 218, which can be any commodity operating system known in the art. An application 112 executes in guest OS 218 of a VM 106. VMs 106 are attached to virtual disks 108, which are backed by storage 210. Applications 112 store app data 114 in virtual disks 108.

Hypervisor 110 includes kernel 224, virtual machine monitors (VMMs) 228, IO filters 214, a filter daemon 213, a local snapshot manager 216, and an NTP daemon 217. Kernel 224 provides operating system functionality (e.g., process creation and control, file system, process threads, etc.), as well as CPU scheduling and memory scheduling. VMMs 228 are processes that provide virtual execution environments for VMs 106. Each VMM 228 manages a corresponding virtual hardware platform that includes virtualized hardware, such as virtual CPUs (vCPUs), virtualized IO devices, and virtualized memory. Local snapshot manager 216 is configured to generate snapshots of VMs 106 in response to commands from an external entity (e.g., MVTCS controller 122). A snapshot generated by the local snapshot manager 216 preserves the current state of a given VM, including the state of CPU registers, RAM, devices, and/or virtual disks. As described further herein, MVTCS controller 122 controls the timing of snapshots generated by local snapshot manager 216 for one or more of VMs 106 when generating a super snapshot. NTP daemon 217 is configured to manage time in hypervisor 110 using the NTP protocol. NTP daemon 217 obtains time information from NTP server 226. IO filters 214 cooperate with filter daemon 213 and MVTCS controller 122 when generating super snapshots, as described further below. In some embodiments, IO filters 214 can communicate with remote filter daemons in other host computers (e.g., other filter daemons 213R).

The MVTCS solution includes MVTCS controller 122, filter daemon 213, and IO filters 214. IO filter 214 is disposed in the IO path for all reads and writes for a particular virtual disk 108 to which it is attached. Thus, each IO filter 214 is attached to a particular virtual disk 108. IO filter 214 also receives notifications for other disk operations, including initiation of snapshots, clones, migrations, etc. In an embodiment, IO filters 214 connect to MVCTS controller 122 through filter daemon 213. When commanded to perform a super snapshot, MVCTS controller 122 coordinates operation across all IO filters 214 connected thereto. MVTCS controller 122 and IO filters 214 cooperate to control the flow of write traffic to virtual disks 108 in order to find a period of quiescence (referred to as a quiescent window (QW)). At the start of a quiescent window, all virtual disks 108 are consistent if snapshotted at that point in time. Upon command from MVTCS controller 122, IO filters 214 cache the write traffic to virtual disks 108 in caches 222 maintained in a backing store 220. In an embodiment, backing store 220 is implemented in storage 210 (e.g., using SSD storage). Alternatively, backing store 220 can be implemented in memory 208. When MVTCS controller 122 finds a quiescent window, MVTCS controller 122 instructs local snapshot manager 216 to generate snapshots of VMs 106. IO filters 214 continue caching write traffic in caches 222 during the local snapshot operations. After the local snapshots are complete, IO filters 214 flush the caches 222 to virtual disks 108 and the super snapshot is complete. While this operation has been described with respect to MVCTS controller 122 and host computer 104, MVCTS controller 122 can be connected to IO filters in one or more additional host computers, each of which functions similar to host computer 104.

Figure 3A:
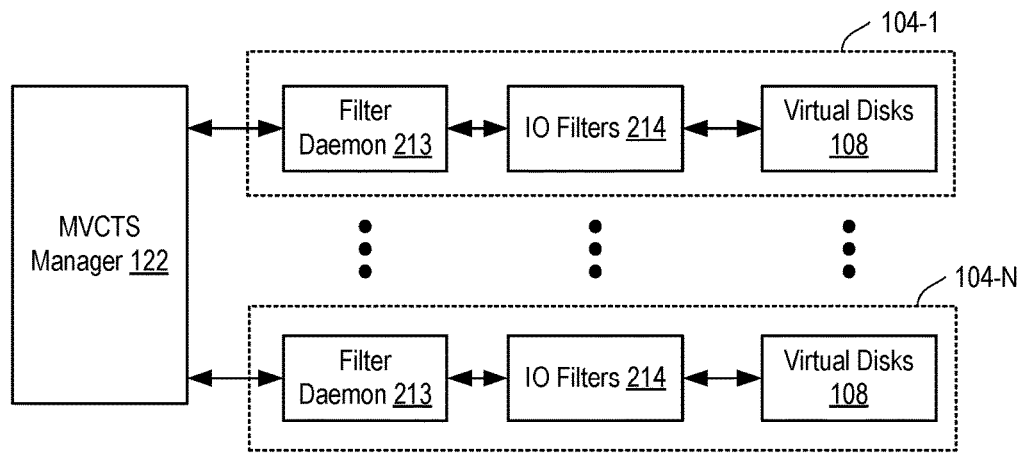
FIGS. 3A-3B are block diagrams depicting a logical view of a multi-virtual machine time consistent snapshot (MVTCS) solution according to an embodiment.
Figure 3B:
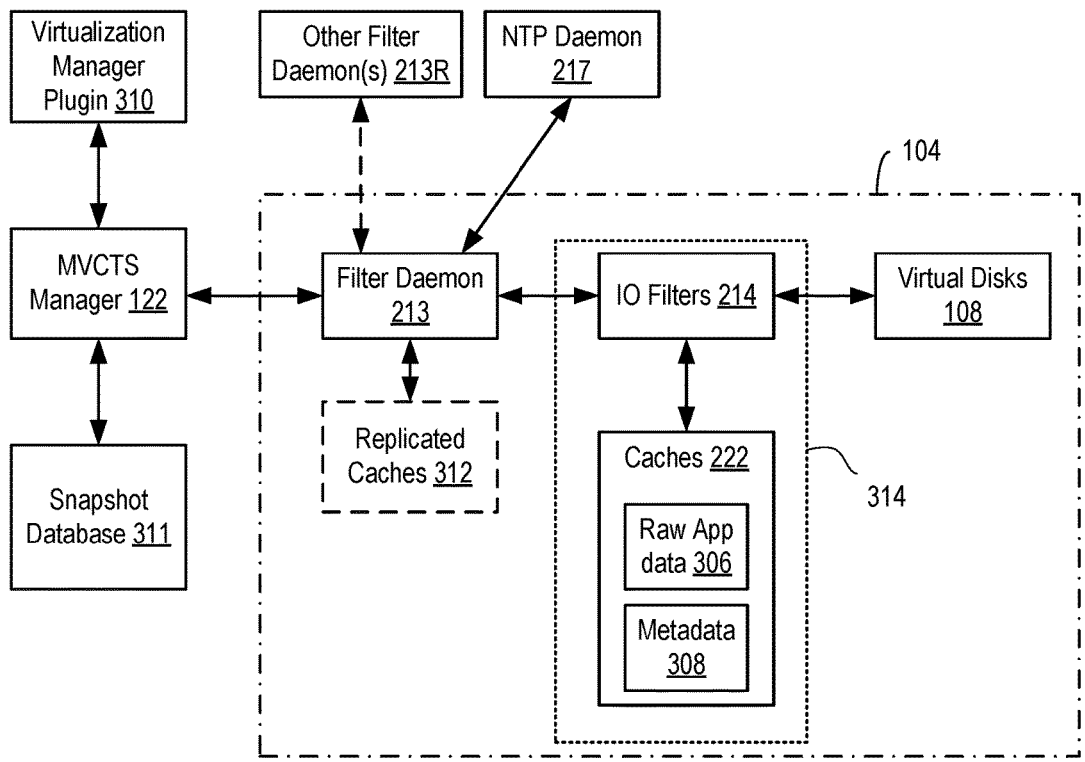

FIGS. 3A-3B are block diagrams depicting a logical view of the MVTCS solution according to an embodiment. As shown in FIG. 3A, MVCTS controller 122 is coupled to host computers 104-1 through 104-N, where N is an integer greater than zero. Each host computer 104 includes a filter daemon 213, IO filters 214, and virtual disks 108. Filter daemon 213 in each host computer 104 connects to MVCTS controller 122. MVCTS controller 122 can acknowledge the connection and, optionally, provides a list of other filter daemons that have connected to MVCTS controller 122. MVCTS controller 122 and filter daemons form a control plane of the MVCTS solution.

As shown in FIG. 3B, filter daemon 213 accepts connections from IO filters 214 on host computer 104. Each IO filter 214 provides the name of a virtual disk 108 to which it is attached as part of the connection information. In an embodiment, connections between IO filters 214 and filter daemon 213 are AF_UNIX domain sockets. Filter daemon 213 creates connections to MVCTS controller 122 for each of IO filters 214. Filter daemon 213 proxies connections between MVCTS controller 122 and IO filters 214 by passing a file descriptor (FD) for each connection to the respective filter instance. This allows each IO filter 214 to communicate directly with MVCTS controller 122 (through filter daemon 213 acting as a proxy). In another embodiment, IO filters 214 are capable of negotiating directly with external entities (e.g., MVCTS controller 122 and other IO filters 214) without the need for filter daemon 213. In such an embodiment, filter daemon 213 can be omitted. For purposes of clarity by example, embodiments described in detail herein include filter daemon 213.

Users can interact with MVCTS controller 122 using a command line interface to issue commands. MVCTS controller 122 can have commands for obtaining status of the hosts and virtual disks under its control, create groups, start super snapshot operations, cancel or abort super snapshot operations, and obtain status of running super snapshot operations. In some embodiments, MVCTS controller 122 can include a REST interface or the like that allows an external controller to control MVCTS controller 122 (e.g., via a virtualization manager plugin 310 executing in a virtualization manager). MVCTS controller 122 can maintain snapshot database 311 for storing super snapshots or metadata that describes the storage locations of the snapshots that form the super snapshots.

In an embodiment, filter daemon 213 connects to one or more other filter daemons 213R in remote host computers. Filter daemon 213 can use connections to other filter daemon(s) 213R to exchange cached write traffic to create redundancy in case of a host failure. Filter daemon 213 creates the connections to other filter daemon(s) 213R, and then proxies these connections for IO filters 214. IO filters 214 can forward cached write traffic to other filter daemon(s) 213R for replication. Filter daemon 213 receives cached write traffic from other IO filters and stores the replicated cache data in replicated caches 312.

IO filters 214 can cache write traffic targeting virtual disks 108 in caches 222. Thus, IO filters 214 and caches 222 implement write caches 314. Each cache 222 stores raw app data 306 and metadata 308. Raw app data 306 is data generated by applications 112 intended to be stored in virtual disks 108. Metadata 308 includes information that describes aspects of raw app data 306. In an embodiment, each cache 222 is a cache file stored in backing store 220. Each cache file can split into blocks (e.g., 4 KB blocks), with each block including some amount of raw app data 306 (e.g., some number of sectors of raw app data 306). IO filter 214 can store metadata 308 in a separate file alongside the cache file (e.g., a sidecar file) or embedded in the cache file. Metadata 308 can include, for each block in the cache file: a signature, a corresponding block number on the target virtual disk, a size or length of the app data, a block number of the storage implementing backing store 220, and a timestamp for when the app data was received. Metadata 308 can also store data global to cache 222, such as starting and ending blocks. Metadata 308 can be duplicated in multiple files for redundancy.

Upon command from MVCTS controller 122, IO filters 214 activate the write caches 314. That is, each IO filter 214 begins caching write traffic in caches 222 and optionally to remote filter daemon(s) 213 for redundancy. Once raw app data 306 is confirmed as written, IO filter 214 completes the write operation with a success status. For read transactions, IO filter 214 checks cache 222 for a full or partial hit (e.g., all or a portion of the requested app data is in cache 222). If the complete read transaction cannot be satisfied from cache 222, IO filter 214 sends the read transaction to the virtual disk. IO filter 214 retrieves any portion of a partial hit from cache 222. From the point of view of the applications, the write and read transactions complete normally and without knowledge of the write caching operation. IO filters 214 do no pause or hold write or read transactions so there is no impact to the applications.

At the start of a super snapshot operation, IO filter 214 begins looking for quiescent periods in the write traffic that are at least as long as the quiescent window. MVCTS controller 122 computes and sends the duration of the quiescent window to IO filters 214. When IO filter 214 detects that write cache 314 is idle for the duration of the quiescent window, IO filter 214 detects an idle period. IO filter 214 reports the start of the idle period to MVCTS controller 122. After reporting the start of an idle period, IO filter 214 will report an end of the idle period when the write cache 314 is no longer idle (e.g., write traffic is cached after reporting the start of the idle period). In this manner, IO filter 214 can report one or more idle periods to MVCTS controller 122. Note that read transactions do not affect determination of the idle period.

Obtaining a time-consistent snapshot across all virtual disks 108 requires that write traffic targeting all virtual disks 108 be quiescent at the same time. However, "time" is not exact in computing environments. For example, code executing on two host computers may have a different idea of what time is, one being ahead or behind the other. Host computers can use NTP or the like to synchronize their clocks in close proximity to one another. For example, NTP has a parts per-second (PPS) accuracy of 50 microseconds. That is, NTP clients can have clocks that are within 50 microseconds of each other. Further, the NTP application programming interface (API) allows clients to determine how inaccurate they are compared to their reference clock. This inaccuracy is referred to herein as clock skew. Writes to multiple virtual disks can straddle or occur anywhere within a 50 microsecond window. Thus, NTP alone does not solve the problem. However, if there is a window of time equal to the maximum skew difference (MSD) among all hosts where no writes occur (e.g., a safe zone), MVCTS controller 122 can command a super snapshot at the start of the window (i.e., the quiescent window).

In an embodiment, each IO filter 214 reports its clock skew to MVCTS controller 122 during its initial handshake. IO filter 214 can obtain its clock skew from NTP daemon 217. IO filter 214 can update its clock skew if it becomes greater than the one last reported. MVCTS controller 122 can take the difference between the earliest and latest clock skews reported by IO filters 214 across all host computers 104 to determine the MSD. MVCTS controller 122 then uses the MSD to determine the size of the quiescent window, which can be some number times the MSD (e.g., 1.5 or 2 times the MSD). During a super snapshot operation, MVCTS controller 122 sends the size of the quiescent window to the IO filters under its control. IO filters 214 only report idle periods that satisfy the duration of the quiescent window.

Figure 4A:
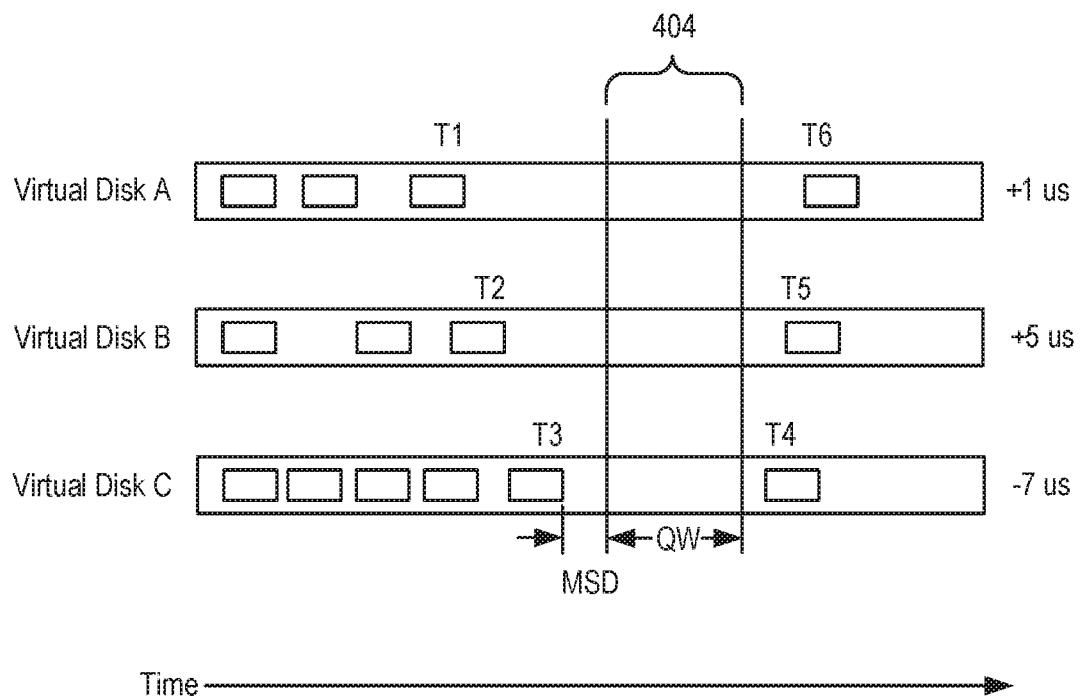
FIG. 4A illustrates determination of a quiescent window across write traffic for three virtual disks.

FIG. 4A illustrates determination of a quiescent window across write traffic for three virtual disks disposed in different host computers. Boxes in FIG. 4 indicate periods of write traffic and spaces between boxes indicate quiescence in the write traffic. Write traffic for a virtual disk A includes an idle period starting at time T1 and ending at time T6. Write traffic for virtual disk B includes an idle period starting at time T2 after time T1 and ending at time T5 before time T6. Write traffic for virtual disk C includes an idle period starting at time T3 after time T2 and ending at time T4 before time T5. In the example, the IO filter for virtual disk A reports a 1 microsecond clock skew. The IO filter for virtual disk B reports a 5 microsecond clock skew. The IO filter for virtual disk C reports a −7 microsecond clock skew.

During a super snapshot operation, each IO filter 214 sends a message to MVCTS controller 122 whenever the IO filter detects write cache 314 is idle more time than the QW. This message is referred to as the QW_IN message. The QW_IN message includes a timestamp of the start of the idle period. Subsequently, each IO filter 214 sends a message to MVCTS controller 122 whenever the IO filter detects write cache 314 is no longer idle. This message is referred to as the QW_OUT message. The QW_OUT message includes a timestamp of the end of the idle period.

Figure 4B:
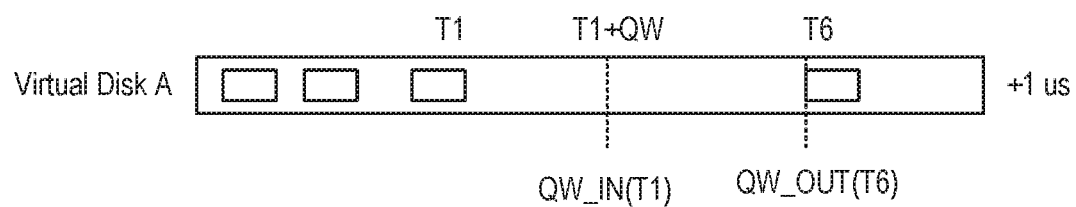
FIG. 4B illustrates input/output (TO) filter activity for a virtual disk in more detail.

FIG. 4B illustrates IO filter activity for virtual disk A in more detail. As shown, write cache 314 for virtual disk A is idle starting at time T1. On or about time T1+QW, IO filter 214 sends a QW_IN message reporting start of an idle period at time T1. Write cache 314 for virtual disk A exits the idle period at time T6. On or about time T6, IO filter 214 sends a QW_OUT message reporting end of the idle period at time T6. Thus, each idle period detected by any IO filter 214 is at least as long as the QW.

Returning to FIG. 4A, MVCTS controller 122 analyzes the overlapping idle periods reported by IO filters 214 to detect a common idle period among all IO filters 214 that is at least as long as the QW. Upon detecting such a common idle period, MVCTS controller 122 has found a quiescent window. In the example, a quiescent window 404 is located in a common idle period between time T3 and time T4. The start of quiescent window 404 is T3+MSD and the end of quiescent window 404 is T3+MSD+QW. Note that the common idle period is at least as long as the quiescent window (equal to or longer than the quiescent window). In the example, the MSD is 12 microseconds. The quiescent window is at least 12 microseconds (e.g., 18 or 24 microseconds). Snapshots of virtual disks A, B, and C will be consistent if taken with all writes prior to T3+MSD committed to the virtual disks, but no other writes committed until completion of the snapshots.

In the embodiment of FIG. 4A, MVCTS controller 122 adjusts the start of quiescent window by the MSD in order to compensate for clock skew at IO filters 214. In another embodiment, IO filters 214 can compensate for clock skew when reporting the start and end times of idle periods. MVCTS controller 122 then operates using compensated start and end times of the idle periods to determine the start of quiescent window 404. In such an embodiment, MVCTS controller 122 does not adjust the start time of quiescent window by the MSD. Rather, MVCTS controller 122 notifies IO filters 214 of a start time, and IO filters 214 adjust that start time based on their respective clock skews.

Figure 5:
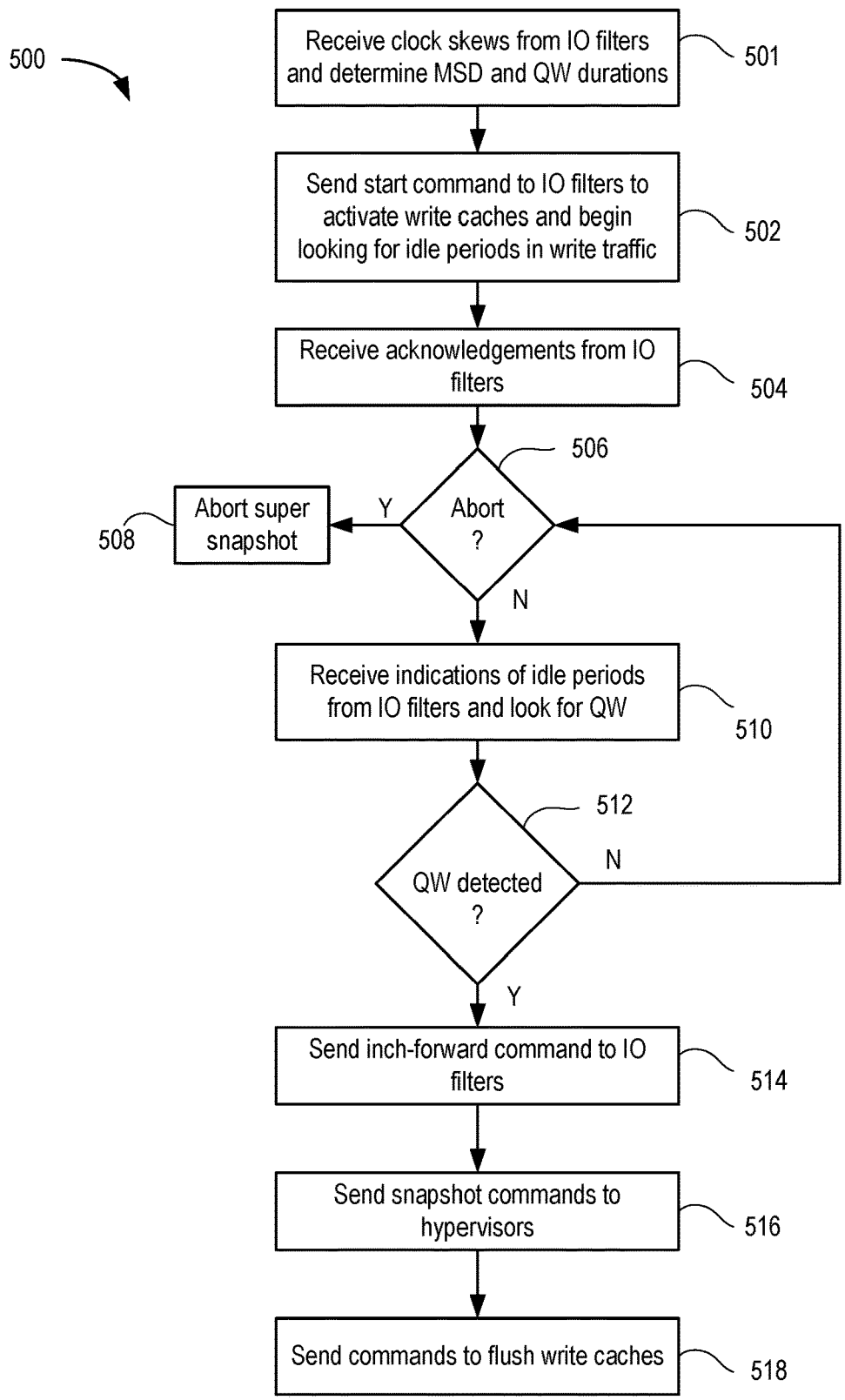
FIG. 5 is a flow diagram depicting a method of managing a super snapshot operation performed by an MVCTS controller according to an embodiment.

FIG. 5 is a flow diagram depicting a method 500 of managing a super snapshot operation performed by MVCTS controller 122 according to an embodiment. Method 500 begins at step 501, where MVCTS controller 122 receives clock skews from IO filters 214 and determines the MSD and QW durations. At step 502, where MVCTS controller 122 sends a start command to IO filters under its control. The start command activates the write caches and causes the IO filters to begin searching for idle periods of the write caches. The start command can include a start time, a quiescent window size, and a maximum time to wait for the quiescent window. At step 504, MVCTS controller 122 receives acknowledgements from the IO filters. At step 506, MVCTS controller 122 determines if the super snapshot operation should be aborted. For example, if one or more of the IO filters do not acknowledge the start command, MVCTS controller 122 can abort the super snapshot operation. If the super snapshot operation is to be aborted, method 500 proceeds to step 508, where MVCTS controller 122 sends an abort command to the IO filters to abort the super snapshot operation. The abort command instructs the IO filters to flush the write caches to the virtual disks. If the super snapshot operation is to continue, method 500 proceeds to step 510.

At step 510, MVCTS controller 122 receives indications of idle periods from the IO filters and looks for a quiescent window. As described above, these idle periods can start and end at different times for different IO filters and can have different durations for different IO filters. At step 512, MVCTS controller 122 determines if a quiescent window has been detected across idle periods of all IO filters. If not, method 500 returns to step 506 and considers whether the super snapshot operation should be aborted. For example, a maximum time to wait for a quiescent window may have elapsed. If the super snapshot operation should be aborted, method 500 proceeds to step 508 as noted above. Otherwise, method 500 continues to step 510, where MVCTS controller 122 continues to receive indications of idle periods from the IO filters and attempts to find a quiescent window. If at step 512 MVCTS controller 122 has detected a quiescent window, method 500 proceeds to step 514.

At step 514, MVCTS controller 122 sends an inch-forward command to the IO filters. The inch-forward command includes a start time of the quiescent window. As described below, in response to the inch-forward command, the IO filters will write cached data to their virtual disks that is time-stamped at or before the start of the quiescent window. At step 516, MVCTS controller 122 sends a snapshot command to each hypervisor in each host computer. The snapshot command indicates that the snapshots include at least virtual disk state. In some embodiments, the snapshot command indicates that the snapshot should not include memory state. At step 518, MVCTS controller 122 sends a flush command to the IO filters. MVCTS controller 122 can send the flush command after receiving acknowledgement of snapshot completion from all of the hypervisors. As described below, in response to the flush command, the IO filters flush the write caches to the virtual disks. At this point, the super snapshot operation has completed.

In method 500, if an error occurs at any step, the failing component sends an appropriate failure message to MVCTS controller 122, which can abort the super snapshot operation (e.g., perform step 508). An administrator may have foreknowledge that a quiescent window is unlikely to occur. In such case, the administrator command MVCTS controller 122 to force an immediate super snapshot operation without waiting for a quiescent window. In an embodiment, MVCTS controller 122 can be configured with an override to force a super snapshot where only a portion of the IO filters report idle periods encompassing a quiescent window before the maximum wait time.

Figure 6:
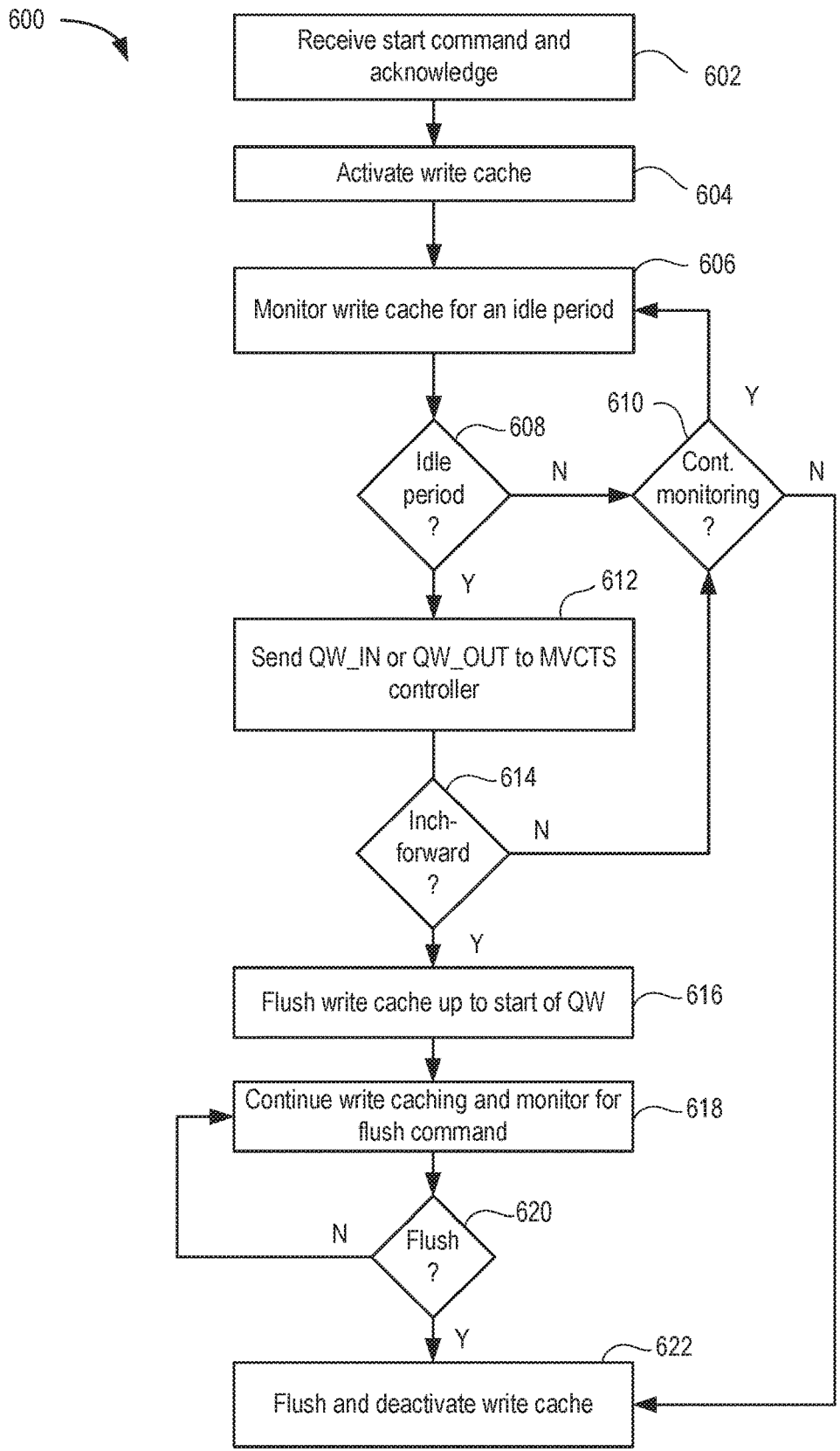
FIG. 6 is a flow diagram depicting a method of operating a write cache during a super snapshot operation according to an embodiment.

FIG. 6 is a flow diagram depicting a method 600 of operating a write cache during a super snapshot operation according to an embodiment. Method 600 begins at step 602, where IO filter 214 receives a start command from MVCTS controller 122. IO filter 214 acknowledges the start command to the MVCTS controller 122. The start command includes a start time and a quiescent window time. The start command can also include a maximum time to wait for a quiescent window. At step 604, IO filter 214 activates write cache 314. That is, IO filter 214 begins caching write traffic targeting virtual disk 108.

At step 606, IO filter 214 monitors write cache 314 for an idle period. As discussed above, an idle period occurs when the write traffic being cached is quiescent for a duration of the quiescent window. At step 608, IO filter 214 determines if a boundary of an idle period has been detected. If not, method 600 proceeds to step 610. At step 610, IO filter 214 determines if it should continue monitoring for an idle period. For example, if the maximum wait time has been exceeded or if MVCTS controller 122 has instructed an abort, IO filter 214 discontinues monitoring. Otherwise, IO filter 214 continues monitoring for an idle period. If IO filter 214 should continue monitoring, method 600 returns to step 606. Otherwise, method 600 proceeds to step 622.

If at step 608 IO filter 214 has detected a boundary of an idle period, method 600 proceeds to step 612. At step 612, IO filter 214 sends a QW_IN message or QW_OUT message to MVCTS controller 122 to indicate a start time or end time of an idle period, depending on the detected boundary. At step 614, IO filter 214 determines whether an inch-forward message has been received. If not, method 600 returns to step 610 and proceeds as described above. If at step 614 IO filter 214 receives an inch-forward message, method 600 proceeds to step 616.

At step 616, IO filter 214 flushes cache 222 up to the start of the quiescent window indicated by MVCTS controller 122 in the inch-forward message. At step 618, IO filter 214 continues write caching and monitors for a flush command from MVCTS controller 122. At step 620, IO filter 214 determines if a flush command has been received. If not, method 600 returns to step 618 and repeats. Otherwise, method 600 proceeds to step 622. At step 622, 10 filter 214 flushes and deactivates write cache 314.

Figure 7:
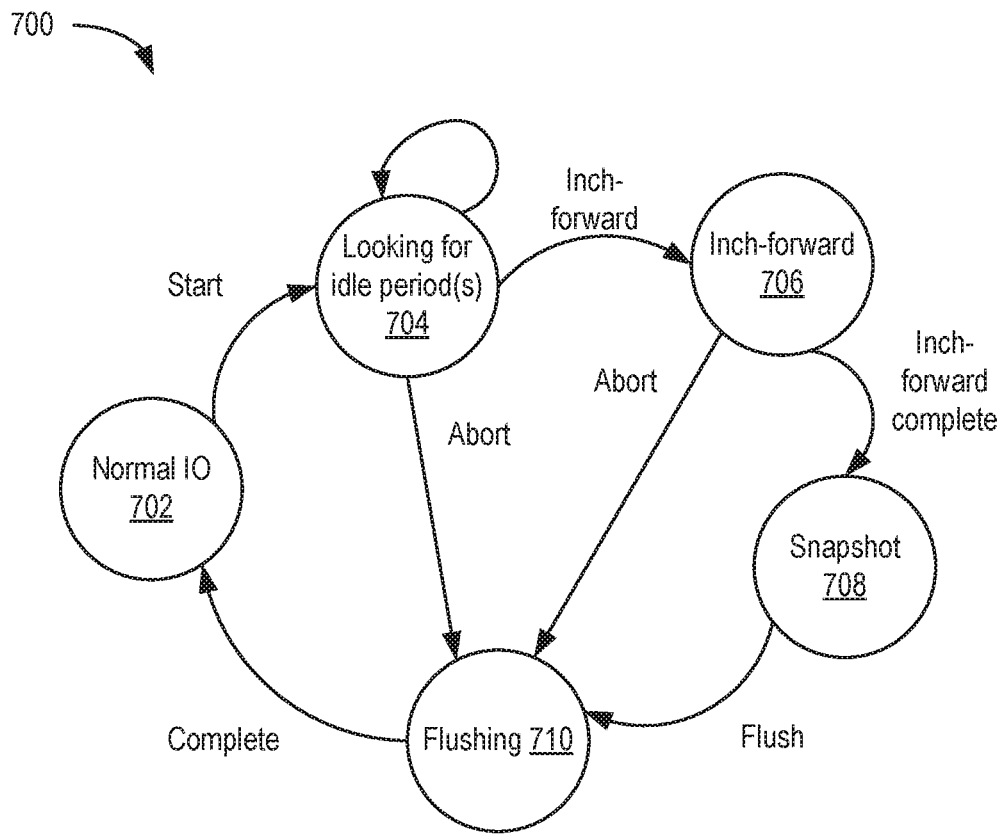
FIG. 7 is a state diagram depicting states of an IO filter according to an embodiment.

FIG. 7 is a state diagram 700 depicting states of an IO filter 214 according to an embodiment. IO filter 214 starts in state 702 (Normal IO). In state 702, all reads and writes are sent directly to virtual disk 108. Upon receiving a start command from MVCTS controller 122, IO filter 214 transitions to state 704 (Looking for idle period(s)). In state 704, IO filter 214 starts a timer of length QW. If the timer fires, IO filter 214 sends a QW_IN message to MVCTS controller 122 and the timer is stopped. Upon receiving a write transaction, IO filter 214 sends the write traffic to cache 222. IO filter 214 checks if the timer has previously fired. If no, IO filter 214 resets the timer. If the timer previously fired, IO filter 214 sends a QW_OUT message to MVCTS controller 122. IO filter 214 satisfies read transactions from virtual disk 108, cache 222, or a combination thereof. Unless IO filter 214 receives an abort command or an inch-forward command, IO filter 214 stays in state 704. Upon receiving an abort command from MVCTS controller 122, IO filter 214 transitions to state 710 (Abort), which is described below.

Upon receiving an inch-forward command from MVCTS controller 122, IO filter 214 transitions to state 706 (Inch-forward). In state 706, IO filter 214 flushes cache 222 to virtual disk 108 up to the start time of the quiescent window. IO filter 214 satisfies read transactions from virtual disk 108, cache 222, or a combination thereof IO filter 214 acknowledges the inch-forward command back to MVCTS controller 122 and completes the command.

Upon completing the inch-forward command, IO filter 214 transitions to state 708 (Snapshot). In state 708, IO filter 214 caches any write traffic in cache 222. IO filter 214 satisfies read transactions from virtual disk 108, cache 222, or a combination thereof. Unless IO filter 214 receives flush command, IO filter 214 stays in state 708.

Upon receiving a flush command from MVCTS controller 122, IO filter 214 transitions to state 710 (Abort). In state 710, IO filter 214 flushes all data from cache 222 to virtual disk 108 in the correct order. Any new IO transactions are queued until the flush operation completes. IO filter 214 sends an acknowledgment to MVCTS controller 122 if no errors occurred. IO filter 214 then transitions back to state 702 (Normal IO) after completion of the flush operation.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of generating time-coordinated snapshots across virtual machines (VMs) managed by at least one hypervisor executing in at least one host computer, the method comprising:
   controlling the at least one hypervisor to activate write caches for caching write traffic, generated by the VMs, targeting virtual disks;
   receiving, from the at least one hypervisor, messages that indicate idle periods in the write traffic;
   determining a quiescent window in the write traffic across the VMs from the idle periods, the quiescent window based upon a maximum skew difference (MSD) associated with the write caches;
   controlling the at least one hypervisor to flush the write caches up to a start time of the quiescent window; and
   controlling the at least one hypervisor to generate snapshots of the VMs.

2. The method of claim 1, wherein each of the idle periods has a duration of at least a duration of the quiescent window.

3. The method of claim 1, further comprising:
   controlling, subsequent to generation of the snapshots, the at least one hypervisor to completely flush, and then deactivate, the write caches.

4. The method of claim 1, wherein the step of receiving the messages comprises:
   receiving a first message indicating a start of a first idle period; and
   receiving a second message indicating an end of the first idle period.

5. The method of claim 1, wherein each of the write caches includes an input/output (IO) filter, and wherein the method further comprises:
   receiving a clock skew with respect to a reference clock from the IO filter in each of the write caches;
   determining the MSD from each clock skew; and
   determining a duration of the quiescent window based on the MSD.

6. The method of claim 5, wherein the start time of the quiescent window compensates for the MSD.

7. The method of claim 5, further comprising:
   establishing a connection with the IO filter in each of the write caches through at least one filter daemon of the at least one hypervisor.

8. A non-transitory computer readable medium having instructions stored thereon that when executed by a processor cause the processor to perform a method of generating time-coordinated snapshots across virtual machines (VMs) managed by at least one hypervisor executing in at least one host computer, the method comprising:
   controlling the at least one hypervisor to activate write caches for caching write traffic, generated by the VMs, targeting virtual disks;
   receiving, from the at least one hypervisor, messages that indicate idle periods in the write traffic;
   determining a quiescent window in the write traffic across the VMs from the idle periods, the quiescent window based upon a maximum skew difference (MSD) associated with the write caches;
   controlling the at least one hypervisor to flush the write caches up to a start time of the quiescent window; and
   controlling the at least one hypervisor to generate snapshots of the VMs.

9. The non-transitory computer readable medium of claim 8, wherein each of the idle periods has a duration of at least a duration of the quiescent window.

10. The non-transitory computer readable medium of claim 8, further comprising:
    controlling, subsequent to generation of the snapshots, the at least one hypervisor to completely flush, and then deactivate, the write caches.

11. The non-transitory computer readable medium of claim 8, wherein the step of receiving the messages comprises:
    receiving a first message indicating a start of a first idle period; and receiving a second message indicating an end of the first idle period.

12. The non-transitory computer readable medium of claim 8, wherein each of the write caches includes an input/output (IO) filter, and wherein the method further comprises:
   receiving a clock skew with respect to a reference clock from the IO filter in each of the write caches;
   determining the MSD from each clock skew; and
   determining a duration of the quiescent window based on the MSD.

13. The non-transitory computer readable medium of claim 12, wherein the start time of the quiescent window compensates for the MSD.

14. The non-transitory computer readable medium of claim 12, further comprising:
   establishing a connection with the IO filter in each of the write caches through at least one filter daemon of the at least one hypervisor.

15. A computing system, comprising:
   a server executing a multi-virtual machine time consistent snapshot (MVCTS) controller; and
   at least one host computer executing at least one hypervisor that manage virtual machines (VMs);
   wherein the MVCTS controller is executable by the server to:
      control the at least one hypervisor to activate write caches for caching write traffic, generated by the VMs, targeting virtual disks;
      receive, from the at least one hypervisor, messages that indicate idle periods in the write traffic;
      determine a quiescent window in the write traffic across the VMs from the idle periods, the quiescent window based upon a maximum skew difference (MSD) associated with the write caches;
      control the at least one hypervisor to flush the write caches up to a start time of the quiescent window; and
      control the at least one hypervisor to generate snapshots of the VMs.

16. The computing system of claim 15, wherein each of the idle periods has a duration of at least a duration of the quiescent window.

17. The computing system of claim 15, wherein the MVCTS controller is further executable by the server to:
   control, subsequent to generation of the snapshots, the at least one hypervisor to completely flush, and then deactivate, the write caches.

18. The computing system of claim 15, wherein the MVCTS controller is executable by the server to receive the messages by:
   receiving a first message indicating a start of a first idle period; and
   receiving a second message indicating an end of the first idle period.

19. The computing system of claim 15, wherein each of the write caches includes an input/output (IO) filter, and the MVCTS controller is further executable by the server to:
   receive a clock skew with respect to a reference clock from the IO filter in each of the write caches;
   determine the MSD from each clock skew; and
   determine a duration of the quiescent window based on the MSD.

20. The computing system of claim 19, wherein the start time of the quiescent window compensates for the MSD.

* * * * *